(12) United States Patent
Kwun et al.

(10) Patent No.: US 10,103,791 B2
(45) Date of Patent: Oct. 16, 2018

(54) DATA TRANSMISSION AND RECEPTION METHOD AND APPARATUS FOR USE IN MIMO SYSTEM

(71) Applicants: Samsung Electronics Co., Ltd, Gyeonggi-do (KR); Korea Advanced Institute of Science and Technology, Daejeon (KR)

(72) Inventors: Jonghyung Kwun, Seoul (KR); Seungri Jin, Busan (KR); Sanguk Park, Seoul (KR); Dongjo Park, Daejeon (KR); Junghyun Park, Gyeonggi-do (KR); Yeonjea Cho, Daegu (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/076,083

(22) Filed: Nov. 8, 2013

(65) Prior Publication Data

US 2014/0126667 A1    May 8, 2014

(30) Foreign Application Priority Data

Nov. 8, 2012  (KR) .................. 10-2012-0126021

(51) Int. Cl.
*H04B 7/02* (2006.01)
*H04B 7/0413* (2017.01)
*H04B 7/06* (2006.01)

(52) U.S. Cl.
CPC ......... *H04B 7/0413* (2013.01); *H04B 7/0691* (2013.01); *H04B 7/0665* (2013.01)

(58) Field of Classification Search
CPC ... H04B 7/0413; H04B 7/0691; H04B 7/0665
(Continued)

(56) References Cited

U.S. PATENT DOCUMENTS 8,451,922 B2 *  5/2013  Dong-Hi et al. ............. 375/267
8,483,200 B2 *  7/2013  Cha ....................... H04B 7/0413
                                                                370/310
(Continued)

Primary Examiner — Dhaval Patel

(57) ABSTRACT

A data transmission and reception method and apparatus in a Multiple-Input Multiple-Output (MIMO) system. The transmission method includes selecting at least one antenna for use in transmission among a plurality of antennas based on transmission data and transmitting the transmission data through the selected antenna. The data transmission and reception method and apparatus are advantageous in increasing the throughput of the MIMO communication system. Also, the data transmission and reception method and apparatus are capable of making it possible to design a superior transceiver in complexity and performance. Also, the data transmission and reception method and apparatus are capable of acquiring extra Degree of Freedom (DOF) and thus increasing the number of symbols that can be transmitted at a time. Furthermore, the data transmission and reception method and apparatus are applicable to conventional MIMO communication systems to obtain extra performance gain without being restricted to certain conditions.

18 Claims, 11 Drawing Sheets

(58) Field of Classification Search
USPC ....... 375/260, 267, 136, 146, 147, 262, 265, 375/295, 316; 370/203, 204, 208, 209, 370/216, 328, 334
See application file for complete search history.

(56) References Cited

U.S. PATENT DOCUMENTS

| | | | |
|---|---|---|---|
| 2008/0307295 A1* | 12/2008 | Sim ...................... | H04B 7/0417 714/807 |
| 2011/0194504 A1* | 8/2011 | Gorokhov ............ | H04B 7/0417 370/329 |
| 2011/0261899 A1* | 10/2011 | Walton ................. | H04B 7/0452 375/295 |
| 2012/0214528 A1* | 8/2012 | Hashimoto et al. .......... | 455/509 |
| 2013/0012144 A1* | 1/2013 | Besoli et al. ................... | 455/85 |

* cited by examiner

FIG. 8
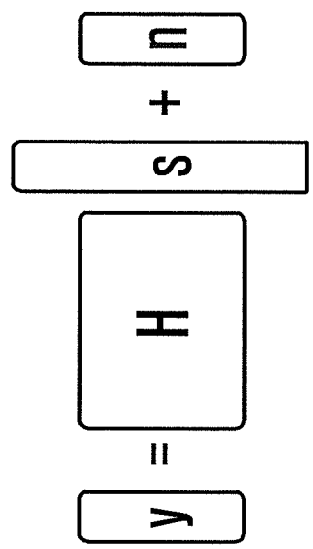
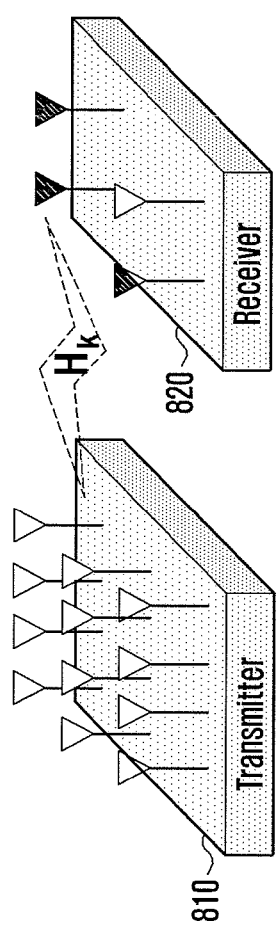

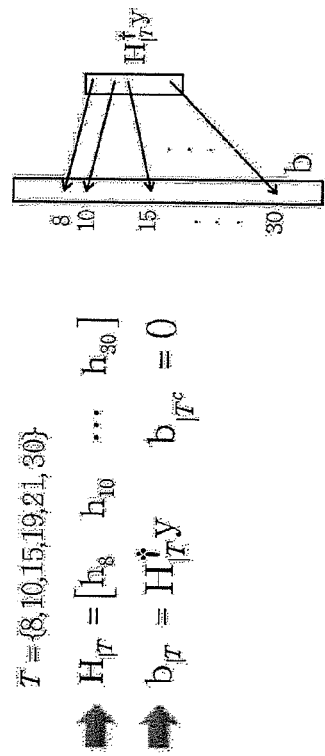
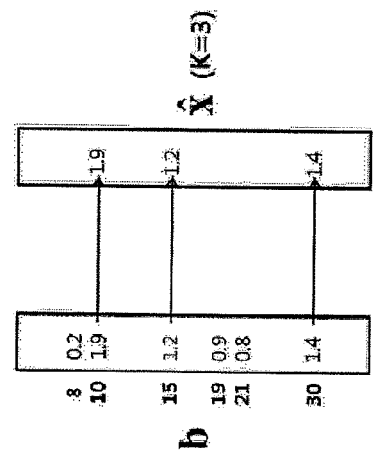
FIG. 10C
FIG. 10D
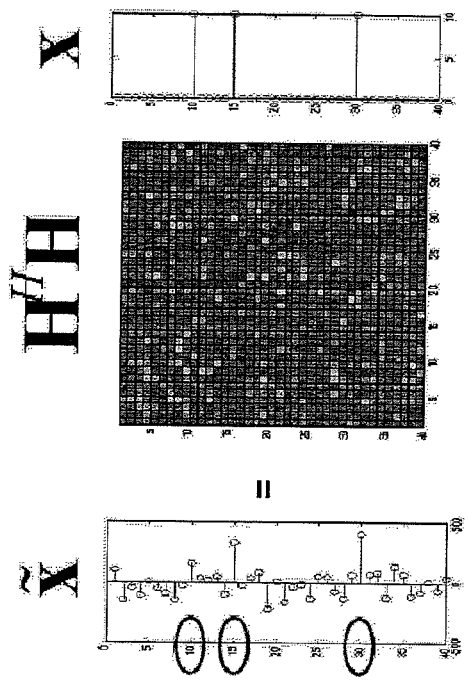
FIG. 10A
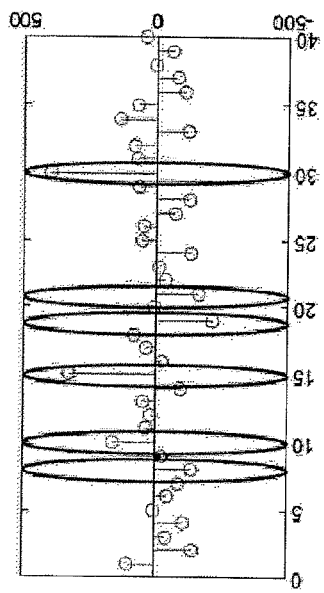
FIG. 10B

DATA TRANSMISSION AND RECEPTION METHOD AND APPARATUS FOR USE IN MIMO SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Nov. 8, 2012 in the Korean Intellectual Property Office and assigned Serial No. 10-2012-0126021, the entire disclosure of which is hereby incorporated by reference.

TECHNICAL FIELD

The present disclosure relates to wireless communication and, in particular, to a method and apparatus for transmitting and receiving data using an antenna selection technique in a Multiple Input Multiple Output (MIMO) system having a plurality of antennas.

BACKGROUND

In order to improve the throughput, a MIMO-based communication method for transmitting and receiving signals through a plurality of antennas is considered in many communication systems.

If the transmission channel condition is known to the sender and the receiver in the MIMO system, it is possible to improve the throughput using the right transmission and reception filters designed for the right purpose.

In this case, all of the communication nodes have to know the information on the MIMO channels to process the signals so as to mitigate interference from adjacent nodes and remove the influence of multiple channels. In the MIMO communication system, unlike the downlink channels that are estimated using pilot signals without difficulty, the uplink channel estimation is not easy due to the necessity of channel information feedback and increases complexity of signal exchange.

Particularly in the MIMO system adopting a beamforming technique, the sender has to know the information on all MIMO channels and the increased signaling overhead boosts the complexity.

In order to reduce to hardware and signal processing complexity of the MIMO system, an antenna selection technique is effective but degrades the system throughput as compared to legacy MIMO systems using all of the antennas.

Typically, the performance of the conventional MIMO communication technologies (multiplexing gain and diversity gain) depend on the number of receive antennas and, although the number of transmit antennas is greater than that of the receive antennas, the number of symbols transmitted at a time is limited by the receive antennas. This means that the use of the transmit antennas greater in number than the receive antennas gives no extra gain.

Accordingly, the large number of transmit antennas in the MIMO communication system increases the implementation complexity. The aforementioned antenna selection technology has been proposed to keep the balance between the system performance and complexity through selective use of the antennas. However, the MIMO communication system based on the antenna selection system also has a drawback in that the increase of the number of antennas boosts the complexity abruptly and thus the overhead.

SUMMARY

To address the above-discussed deficiencies, it is a primary object to provide a modulation method and apparatus selecting antennas and modulating the selected antennas in the MIMO system.

Also, the present disclosure aims to provide a method and apparatus for selecting transmit antenna that is capable of improving system throughput in the MIMO system.

In accordance with an aspect of the present disclosure, a data transmission method of a transmitter in a Multiple-Input Multiple-Output (MIMO) system is provided. The method includes selecting at least one antenna for use in transmission among a plurality of antennas based on transmission data and transmitting the transmission data through the selected antenna.

In accordance with another aspect of the present disclosure, a transmitter for transmitting data in Multiple-Input and Multiple-Output (MIMO) system is provided. The transmitter includes an antenna array which includes more than one antenna and transmits signals to a receiver and a controller which controls the antenna array to select at least one antenna for use in transmission among a plurality of antennas based on transmission data and transmit the transmission data through the selected antenna.

In accordance with another aspect of the present disclosure, a data reception method of a receiver in a Multiple-Input Multiple-Output (MIMO) system is provided. The method includes estimating antennas used by a transmitter for transmitting a signal based on the signal and determining data transmitted by the transmitter based on estimated antenna information and the received signal.

In accordance with still another aspect of the present disclosure, a receiver for receiving data in Multiple-Input and Multiple-Output (MIMO) system is provided. The receiver includes an antenna array which includes more than one antenna and receives signals transmitted by a transmitter and a controller which estimates antennas used by a transmitter for transmitting a signal based on the signal and determines data transmitted by the transmitter based on estimated antenna information and the received signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a diagram of a downlink system model according to an embodiment of the present disclosure;

FIGS. 10A-10D illustrate a diagram of the operation of the receiver in the procedure of FIG. 9.

DETAILED DESCRIPTION

Figure 1:
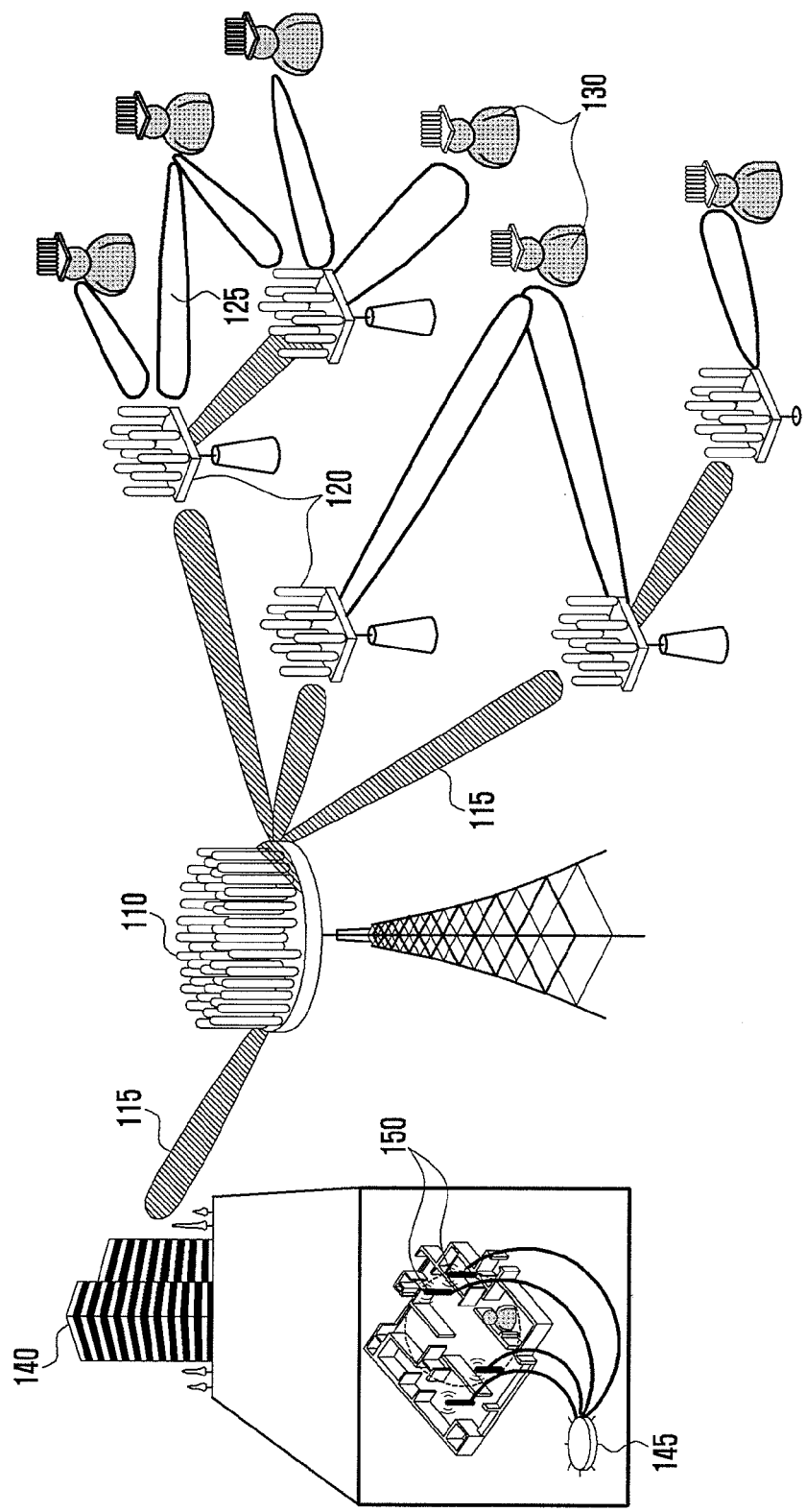
FIG. 1 illustrates a diagram of a structure of the communication system according to an embodiment of the present disclosure.

FIGS. 1 through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure are described with reference to the accompanying drawings in detail. Detailed description of well-known functions and structures incorporated herein may be omitted to avoid obscuring the subject matter of the present disclosure. This aims to omit unnecessary description so as to make the subject matter of the present disclosure clear.

For the same reason, some of elements are exaggerated, omitted or simplified in the drawings and the elements may have sizes and/or shapes different from those shown in drawings, in practice. The same reference numbers are used throughout the drawings to refer to the same or like parts.

FIG. 1 illustrates a diagram illustrating a structure of the communication system according to an embodiment of the present disclosure.

The present disclosure is directed to the 5$^{th}$ Generation (5G) communication system including macro and femto base stations. As shown in FIG. 1, the macro and femto base stations are connected each other through wireless backhauls, and each of the macro and femto base stations has a plurality of antennas for implementing wireless backhaul and Beam Division Multiple Access (BDMA). The conventional communication systems also adopt MIMO technology to obtain multiplexing and diversity gains and use related communication technologies. However, it is difficult to apply the MIMO technology used in the conventional communication systems to the 5G system considered as a massive MIMO system operating with an excessively large number of antennas without modification in the present disclosure. If the large number of antennas is used in communication, this increases the number of RF chains, resulting in increase of system complexity and hardware cost. Furthermore, the channel estimation and beamforming with the multiple channels increases the system complexity from the view point of signal processing. There is therefore a need of a communication method capable of using antennas selectively for resource utilization efficiency while reducing the system complexity even in the MIMO environment of significantly large number of antennas.

Referring to FIG. 1, the communication system according to an embodiment of the present disclosure includes a macro base station 110 and a plurality of femto base stations 120. The macro and femto base stations 110 and 120 may connect to each other through wireless backhaul links. The macro base station 110 may include a plurality of antennas for implementing wireless backhaul and Beam Division Multiple Access (BDMA).

The base station (hereinafter, referred to interchangeably as User Equipment and UE) may connect to the femto base station (hereinafter, referred to interchangeably as evolved Node B and eNB) 120 through a radio access link.

The macro eNB 110 may connects to a Central Management Unit (CMU) 145 installed inside a building 140 through a wireless backhaul 115. Since the CMU 145 is located inside the building 140, it is possible to facilitate exchanging signals with an Access Point (AP) 145 installed in the building 140.

Each of the macro eNB 110, femto eNB 120, UE 130, CMU 145, and AP 150 is provided with a plurality of antennas for transmitting and receiving signals. The number of antennas of each entity may vary depending on the embodiment.

Figure 2:
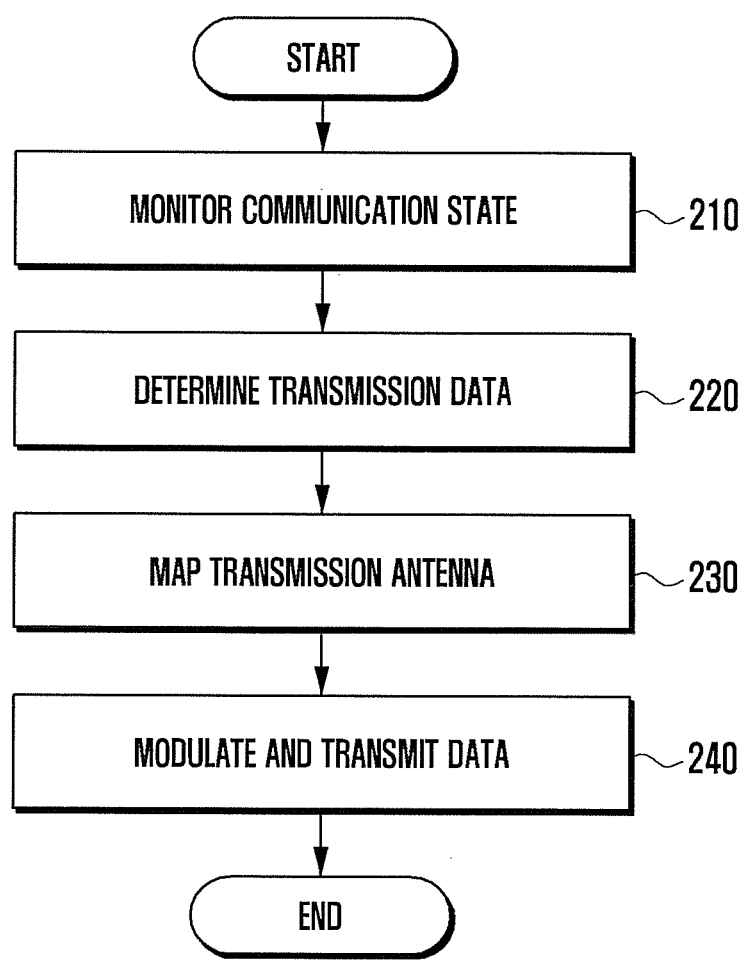
FIG. 2 illustrates a flowchart of the data transmission method according to an embodiment of the present disclosure.

FIG. 2 illustrates a flowchart illustrating the data transmission method according to an embodiment of the present disclosure.

Referring to FIG. 2, the transmitter monitors communication state at operation 210. The transmitter may include a plurality of antennas. The communication state may include the state of the channel for transmitting signals to the receiver. According to an embodiment of the present disclosure, the transmitter may measure the channel condition for communication through each antenna. However, operation 210 may be performed selectively.

The transmitter may determine the transmission data. The transmission data may be the data to be transmitted to the receiver and include binary data. The transmitter may acquire some bits of the transmission data.

At operation 230, the transmitter may determine the antennas to be used for transmitting the determined transmission data. The transmitter selects some of the plural antennas to transmit data according to the configuration of the transmission data. The transmission data-based antenna selection may follow a predetermined rule which may be shared between the transmitter and the receiver. Assuming that the number of antennas of the transmitter is T and the number of antennas selected for transmission is K, it is possible to transmit the data as much as $_TC_K$. In detail, if T=5 and K=2, total $_5C_2$=10 antenna combinations exist and each antenna may transmit data of up to 3 bits. According to an embodiment, a rule of determining the transmission bits allocated depending on the antenna selection may be proposed as follows.

TABLE 1

| Positions of Antennas Turned On | Indication Bits |
|---|---|
| 1, 2 | 000 |
| 1, 3 | 001 |
| 1, 4 | 010 |
| 1, 5 | 011 |
| 3, 4 | 111 |

If the three bits of the position of the transmission data are 010 as shown in table 1, the transmitter turns on the antennas 1 and 4 to transmit data. The transmission data and transmit antenna mapping may be determined in various manner according to the embodiment and, preferably, the transmit antenna may be mapped based on the data transmitted first.

At operation 240, the transmitter modulates the transmission data with the exception of the number of bits capable of expressing through antenna selection at operation 230 and transmits the modulated data through the selected antenna. If the data to be transmitted is expressed as 010110011 . . . , the transmitter turns on the antennas 1 and 4 to transmit data of 010 and modulates the rest data of 110011 . . . to transmit the modulated data. In another embodiment, the transmitter excludes the number of bits expressible through antenna selection and adds supplementary data for use in verifying the validity of the data to be transmitted through the selected antennas. For example, the transmitter may add parity bits for use in verifying the validity of the transmission data.

Figure 3:
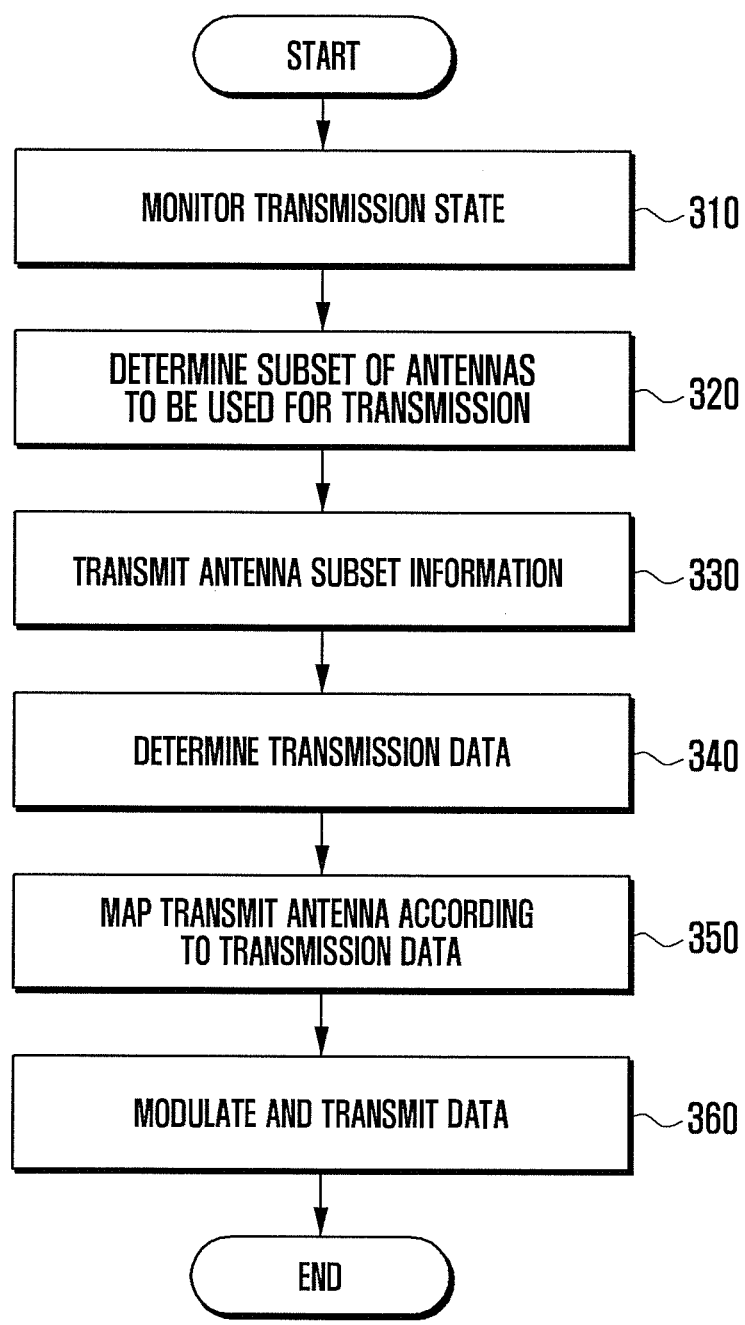
FIG. 3 illustrates a flowchart of the data transmission method according to another embodiment of the present disclosure.

FIG. 3 illustrates a flowchart illustrating the data transmission method according to another embodiment of the present disclosure.

Referring to FIG. 3, the transmitter may monitor the communication state at operation 310. The transmitter may include a plurality of antennas. The communication state may include the state of the channel for transmitting signal from the transmitter to the receiver. According to an embodiment of the present disclosure, the transmitter may measure the channel condition of each antenna.

At step 320, the transmitter may select antennas for use in the data transmission based on the channel state measured at operation 310. In more detail, the transmitter may receive Channel Quality Information (CQI) fed back based on the measured channel state and select the antenna having CQI equal to or greater than a threshold value for allowing communication. Accordingly, the data are transmitted through a subset of antennas selected among the antennas. In an embodiment, the transmitter may transmit the data through the antennas having CQI equal to or greater than a threshold value to acquire extra DOF due to the transmit antenna selection and guarantee data transmission reliability to some extent.

At operation 330, the transmitter may send the receiver the information on the subset of the antennas selected at operation 210. According to an embodiment, the information on the subset of the selected antennas may be transmitted in the form of a bitmap. The receiver may predict the data transmission on some of the subset of the selected antennas based on the bitmap. In another embodiment, if the receiver knows the threshold value of CQI for selecting antenna, it may possible to estimate the antenna to be selected inversely based on the channel measurement.

The receiver may acquire the information on the subset of the antennas to be selected by the transmitter for data transmission at operation 330.

The transmitter may determine the transmission data at operation 340. The transmission data may include the binary data to be transmitted from the transmitter to the receiver. The transmitter may acquire configuration of some bits of the transmission data.

At operation 350, the transmitter may determine the antennas for transmitting data determined at operation 340. Determining antennas may include determining the antennas in the subset of the antennas selected at operation 210. According to the configuration of the transmission data, the transmitter may select some of the antennas of the transmitter for data transmission. Selecting the antennas based on the transmission data may follows a predetermined rule which is shared between the transmitter and the receiver.

At operation 360, the transmitter may modulate the transmission data with the exception of the number of bits of being expressible through antenna selection at operation 350 and transmit the modulated data to the receiver through the selected antennas. For example, if the transmission data is expressed as 010110011 . . . , the transmitter turns on the antennas 1 and 4 to transmit data of 010 and modulates the remained data of 110011 . . . for transmission. In another embodiment, the transmitter excludes the number of bits expressible through antenna selection and adds supplementary data for use in verifying the validity of the data to be transmitted through the selected antennas. For example, the transmitter may add parity bits for use in verifying the validity of the transmission data.

In another embodiment, if the channel condition measured at operation 310 is bad, the procedure may not progress to the step 310 but the communication is performed as in the legacy MIMO communication system.

Figure 4:
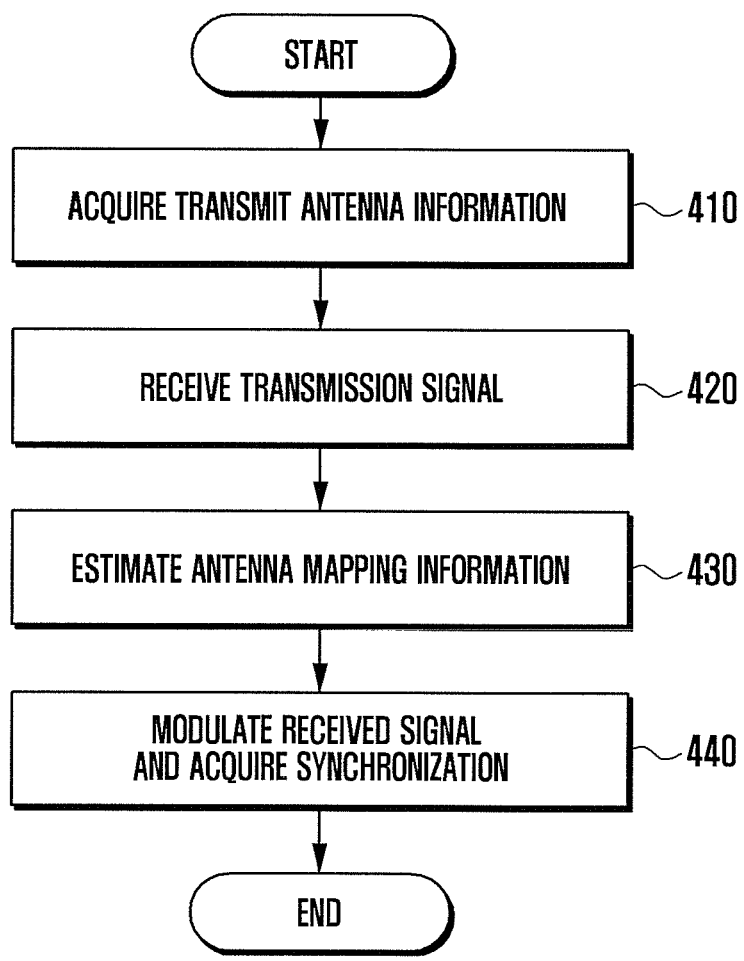
FIG. 4 illustrates a flowchart of the data reception method according to an embodiment of the present disclosure.

FIG. 4 illustrates a flowchart illustrating the data reception method according to an embodiment of the present disclosure.

Referring to FIG. 4, the receiver may receive transmit antenna information from the transmitter at operation 410. In the case that the transmitter selects the antennas guaranteeing CQI equal to or greater than a predetermined threshold for data transmission, the receiver may receive the information on the selected antennas from the transmitter at operation 410. The selected antenna information may be transmitted in the form of a bitmap. In another embodiment, if the transmitter transmits data using all the antennas, a predetermined indicator may be transmitted. At step 410, the receiver may receive the information on the subset of the antennas for use in data transmission of the transmitter.

The receiver may receive signals transmitted by the transmitter at operation 420. The transmitter turns on some antennas of the selected antenna subset to transmit data.

At operation 430, the receiver may estimate the antennas of the transmitter that are turned on at operation 420 to transmit data. The antennas may be estimated based on the signal characteristics. The related method is described later.

At operation 440, the receivers estimates the data transmitted through antenna mapping from the signal received based on the information on the transmit antenna estimated at operation 430 and demodulates the received signal. The receiver acquires synchronization between the data transmitted through antenna mapping and the data demodulated from the received signal to decode the data transmitted by the transmitter. In this way, the receiver may receive the data transmitted through antenna mapping and the data transmitted through data transmission method of the legacy MIMO system.

Figure 5:
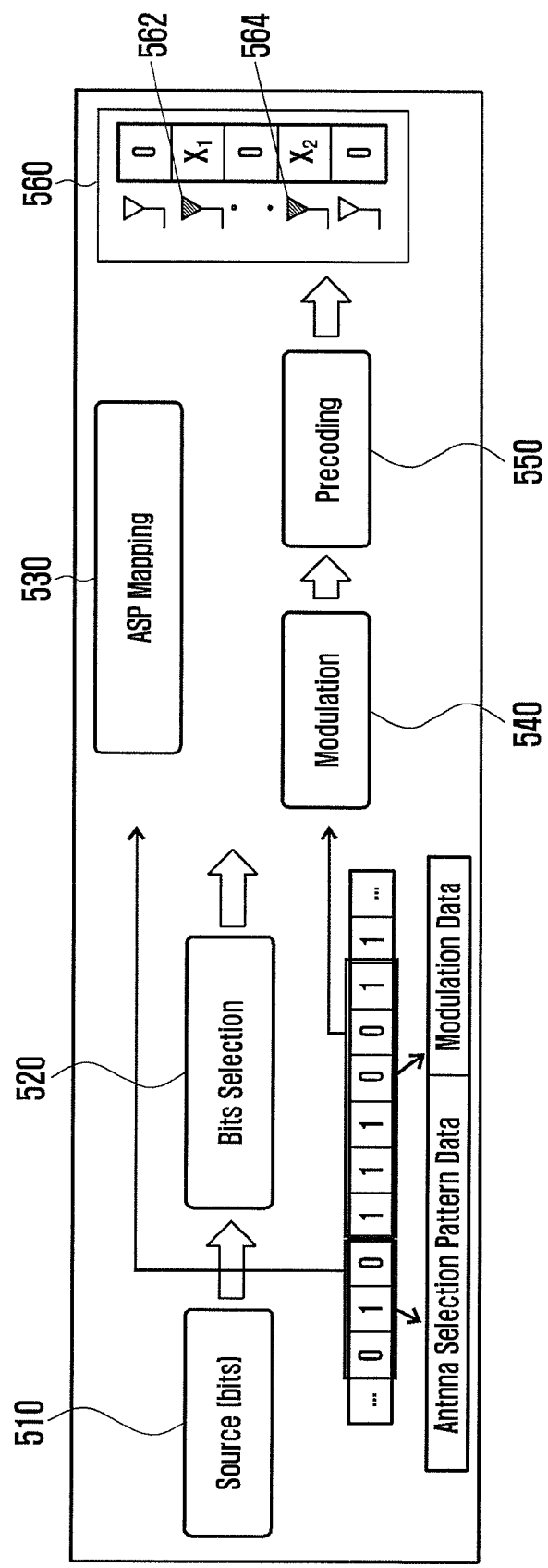
FIG. 5 illustrates a diagram of the operation of data transmission in the data transmission apparatus according to an embodiment of the present disclosure.

FIG. 5 illustrates a diagram illustrating the operation of data transmission in the data transmission apparatus according to an embodiment of the present disclosure.

The transmitter may transmit the source data 510. The transmission data may be . . . 0101110011 . . . in this embodiment. The transmitter includes total 5 antennas. The transmitter selects two antennas for data transmission. The number of antennas to be selected may be determined by the transmitter depending on the channel state. In the case that two antennas are turned on to transmit data, the number of cases is $_5C_2$=10 such that up to 3 bits of data may be transmitted through antenna mapping.

The bit selector 520 may transfers the bits transmittable through antennal mapping among the transmission data to the Antenna Selection Pattern (ASP) mapper 530. The bit selector 520 transfers the remained data bits to the modulator 540. The data modulated by the modulator 540 is precoded by the precoder 550.

The antenna mapper 530 may select the antennas corresponding to the data (in this embodiment, 010) transmitted through antenna mapping from the antenna array 560. The method for selecting antennas in the antenna array 560 through antenna mapping may be predetermined. In this embodiment, the antennas corresponding to the bits of 010 are antenna X1 562 and antenna X2 564, and the antenna array 560 turns on the antenna X1 562 and antenna X2 564 for transmitting the modulated data.

In this embodiment, it is possible to transmit supplementary data bits using an antenna selection pattern. This makes it possible to obtain extra gain only with the use of the selected antenna index information without adding extra hardware or communication block.

In this embodiment, the transmitter may transmit the signal modulated in M-QAM through the selected antennas and obtain the gain as much as the number of combinations that can be generated as antenna selection pattern as compared to the conventional communication technology. That is, extra symbols as many as the number of cases of the combinations of some antenna among all transmit antennas may be transmitted. In this embodiment, since the antenna selection pattern includes data in itself, it is necessary for the receiver to locate the antenna positions and recover the symbols according to the pattern. As described above, the present disclosure is capable of adopting the conventional MIMO communication technology without modification. Furthermore, the present disclosure is capable of obtaining extra DOF using the antenna selection patterns.

Figure 6:
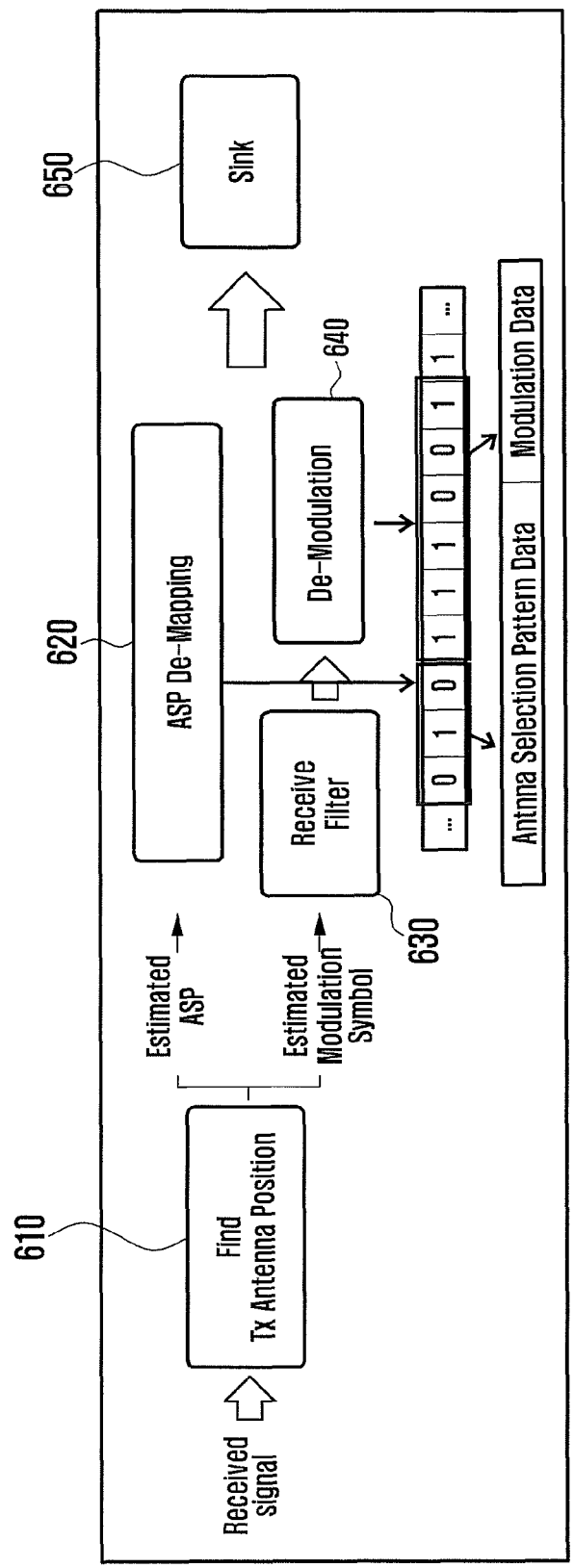
FIG. 6 illustrates a diagram of the operation of data reception in the data reception apparatus according to an embodiment of the present disclosure.

FIG. 6 illustrates a diagram illustrating the operation of data reception in the data reception apparatus according to an embodiment of the present disclosure.

Referring to FIG. 6, if the signal transmitted by the transmitter is received, the receiver may determine the antennas used by the transmitter for transmission by means of the antenna position finder 610 based on the received signal. The antenna position finder 610 may determine the data transmitted by the transmitter using the antenna pattern by means of the Antenna Selection Pattern (ASP) de-mapper 620. In this embodiment, the transmitter transmits signals through the antenna X1 562 and the antenna X2 564, and the ASP de-mapper 620 estimates the data of 010 based on the signals.

The antenna position finder 610 transfers the received signal to the receive filter 630 and demodulates the signal transmitted by the transmitter by means of the demodulator 640.

The Sink matching unit 650 may recover the data transmitted by the transmitter from the signal passed through the ASP de-mapper 620 and the demodulator 640.

Figure 7:
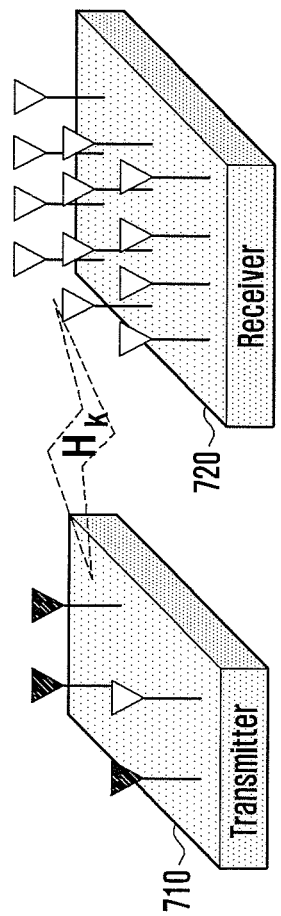
FIG. 7 illustrates a diagram of an uplink system model according to an embodiment of the present disclosure.

FIG. 7 illustrates a diagram illustrating an uplink system model according to an embodiment of the present disclosure.

Referring to FIG. 7, the uplink system is characterized in that the number of transmit antennas ($N_T$) of the transmitter 701 is less than the number of receive antennas ($N_R$) of the receiver 720. In an alternative embodiment, the number of transmit antennas of the transmitter may be greater than the number of receive antennas of the receiver in uplink.

The transmitter 710 selects K antennas among $N_T$ transmit antennas to transmit data to the receiver 720. In this embodiment, $N_T$, $N_R$, and K may have the relationship of $N_R \geq N_T \geq K$.

Since the number of antennas of the receiver 720 is greater than that of the transmitter (i.e. it is a determined system), it is possible to find the indices of the antennas used for transmission using ZF-Detector or MMSE-Detector. The receiver 720 may estimate the data determined according to the index of the antenna used by the transmitter 710. In this embodiment, the receiver 720 may receive data in the same method of FIG. 6.

FIG. 8 illustrates a diagram illustrating a downlink system model according to an embodiment of the present disclosure.

Referring to FIG. 8, the downlink system is characterized in that the number of transmit antennas ($N_T$) of the transmitter 801 is greater than the number of receive antennas ($N_R$) of the receiver 820. In an alternative embodiment, the number of transmit antennas of the transmitter may be less than the number of receive antennas of the receiver in downlink.

The transmitter 810 selects K antennas among $N_T$ transmit antennas to transmit data to the receiver 820. In this embodiment, $N_T$, $N_R$, and K may have the relationship of $N_T \geq N_R \geq K$.

Since the number of antennas of the receiver 820 is less than that of the transmitter (i.e. it is an undetermined system), there is a need of a method for determining a pattern of antennas used by the transmitter 810 for transmitting signals. The antenna pattern determination method is described later.

Figure 9:
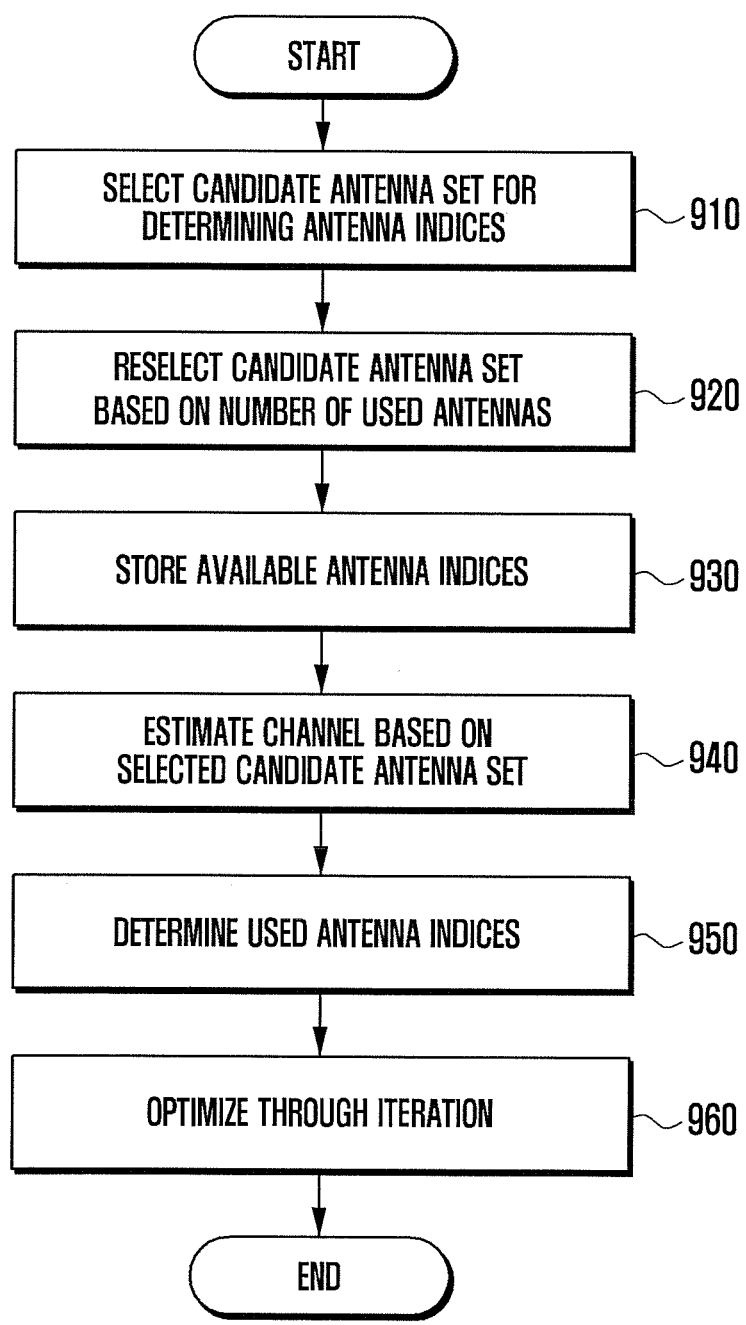
FIG. 9 illustrates a flowchart of a procedure of for the receiver to estimate the antenna pattern used by the transmitter for data transmission in the data reception method according to an embodiment of the present disclosure.

FIG. 9 illustrates a flowchart illustrating a procedure of for the receiver to estimate the antenna pattern used by the transmitter for data transmission in the data reception method according to an embodiment of the present disclosure, and FIGS. 10A-10D illustrate the operation of the receiver in the procedure of FIG. 9.

In this embodiment, the receiver has to have a capability of determining the antenna used by the transmission for data transmission. In order to accomplish this, compressed sensing-related techniques are required.

The compressed sensing is an algorithm capable of recovery even in the situation where the observed value is less than the predicted value.

In the compressed sensing, it is preferred that the preceding data are transmitted sparsely (number of is greater than that of Os in transmission data) and the measurement matrix (channel matrix in communication situation) is random. The assumption of sparseness may be the case when the number of antennas for use in transmission is less than the number of antennas not used.

In this embodiment, it is preferred that the communication channel has Gaussian distribution. In the case of using the antenna selection pattern of this embodiment, it is possible to fulfill the sparseness of data. It is an exemplary that two antennas are selected for data transmission among the total 10 transmit antennas.

As a consequence, the receiver recovers the signals transmitted by the transmitter. The transmitter has transmitted the sparse information (on-off pattern of antennas), and the receiver recovers this information. The operation of the receiver may be expressed L0-optimization problem as follows.

$$\min_{\tilde{s} \in C^n} \|x\|_0 \text{ subject to } Ax = y$$

That is, L0-optimization is to find a signal having a predetermined size among the received signals. This is equivalent to the problem finding the index of the antenna for transmitting signal among a plurality of antennas. However, this problem is NP hard problem such that there is no closed solution. An algorithm for solving this problem in another aspect to acquire similar result is the compressed sensing. At this time, the solution is obtained by solving L1-optimization problem.

$$\min_{\tilde{s} \in C^n} \|x\|_1 \text{ subject to } Ax = y$$

This is to solve the optimization problem minimizing L1 norm and, if the condition assumed in the compressed sensing is fulfilled, solving the L1 optimization problem may be equivalent to solving the L0 optimization problem.

Therefore, a recovery algorithm for minimizing the size of the received signal may be required, and there is large number of compressed sensing recovery algorithms. The present disclosure makes it possible to implement the algorithm with low complexity. Preferably, the algorithm may be implemented with CoSaMP technique.

In order to raise such an example, the following system may be considered.

System Model: y=Hx
Input: y, H, K (Number of non-zero elements)
Initialization r=y Referring to FIGS. 9 and 10A-10D, the receivers may select a group of candidate transmit antennas based on the signal received for determining the index of the antenna used by the transmitter for data transmission. According to an embodiment, the receiver may generate a proxy vector by multiplying Hermitian of the channel of the received signal.

$$\tilde{x} = H^H r( = H^H y)$$
$$= H^H H x + H^H n$$

This operation is illustrated in FIG. 10A. In this embodiment, the antennas indicated by indices 10, 15, and 30 may be the group of candidate transmit antennas. By performing post-processing on the received signal after filtering, the receiver may select the group of candidate transmit antennas indicated by the indices of the antennas used in transmission.

The transmitter may reselect the group of candidate antennas based on the number of antennas used by the transmitter (K) at operation 920. In this embodiment, 2K candidate transmit antennas having high received signal strengths thanks to the channel condition may be selected. This is illustrated in FIG. 10B and, in this embodiment, K=3 and up to 6 candidate antennas can be selected. In this embodiment, the antenna indices of 8, 10, 15, 19, and 30 may be selected.

At operation 930, the receiver may store the indices of the antennas having high probability of use by the transmitter based on the candidate antennas reselected at operation 920.

At operation 940, the receiver may estimate channels based on the candidate antennas of which indices are stored at operation 930. In this embodiment, the receiver may establish a channel composed of the candidate antennas indicated by the stored indices and perform Least Square Estimation using the channel. This is illustrated in FIG. 10C.

At operation 950, the receiver may determine K indices based on the value estimated at operation 940. In detail, the receiver may determine K indices of the antennas transmitted signals of highest received signal strengths as illustrated in FIG. 10D and, in this embodiment, the antennas indicated by the indices 10, 15, and 30 are selected.

At operation 960, the receiver performs operations 910 to 950 repeatedly with Successive Interference Cancellation using the received signal and estimation value until the error rate drops to an intended level.

$$r = y - H\hat{x}$$

Figure 11A:
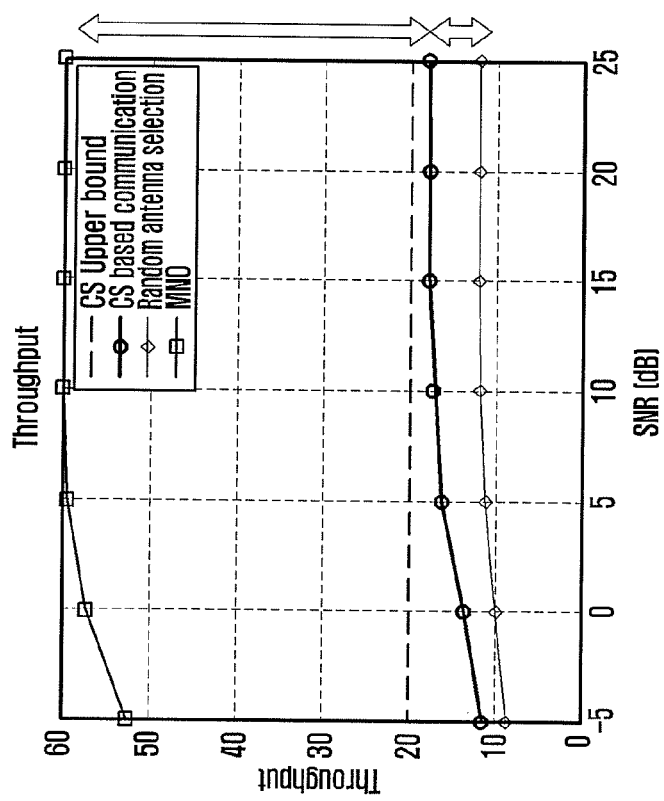
FIGS. 11A-11B illustrate graphs of system throughput in use of the data transmission and reception method according to an embodiment of the present disclosure.
Figure 11B:
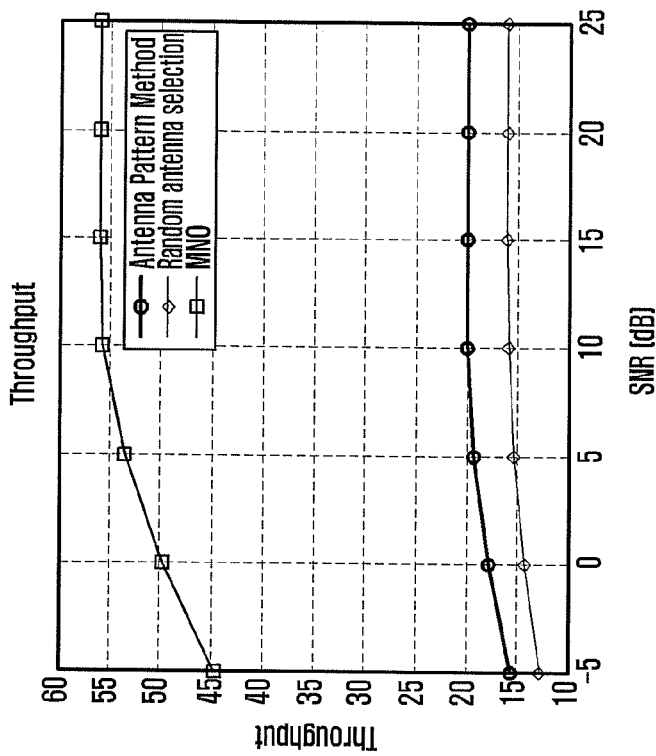

FIGS. 11A-11B illustrate graphs of system throughput in use of the data transmission and reception method according to an embodiment of the present disclosure. The data transmission and reception method of the present disclosure is capable of improving DOF with the use of antenna selection patterns, resulting in increase of system throughput. The throughput may denote the data amount transmittable at a time without error and be defined as following formula.

$$(1-BER) \times N_{TXbit}$$

In FIG. 11A illustrates a graph of the throughput improvement in downlink using 64-AQ, and FIG. 11B illustrates a graph of the throughput improvement in uplink using 256-QAM. The uplink throughput has been measured in the environment of $N_T=7$, $N_R=50$, and K=2; and the downlink throughput has been measured in the environment of $N_T=24$, $N_R=10$, and K=2.

In the case of the technique using all antennas, i.e. full MIMO, the number of transmittable symbols is equal to the least value between the number of transmit antennas and the number of receive antennas (N=min($N_T,N_R$)). If the transmitter and the receiver know the transmission channel, it is possible to reduce the influence of the channel attenuation and interference channel by manufacturing well-designed transmission and reception filters.

The antenna selection technology is the technology of selecting K antennas among a plurality of antennas for transmission. After selecting the antennas, the full MIMO technology may be used as described above. This means that the performance enhancement may be achieve using the transmission and reception filters. In this method, it is possible to reduce the number of transmit antennas, resulting in extra gain in complexity.

In an exemplary downlink transmission using 24 transmit antennas and 10 receive antennas, if the full MIMO is adopted, 10 symbols can be transmitted simultaneously. In the case of the antenna selection technology using K antennas for signal transmission, it is possible to transmit K symbols simultaneously. In contrast, the data transmission method of the present disclosure is capable of transmitting extra symbols of $$\binom{N_T}{K} = \binom{24}{2} = 276$$

using the antenna selection pattern in addition to K symbols. In the case of using 64-QAM, the numbers of transmission bits for the respective technologies are as follows.

Full MIMO technology: $N_R \times \log_2 M = 10 \times \log_2 64 = 60$ bit

Antenna selection technology: $K \times \log_2 M = 2 \times \log_2 64 = 12$ bit

Antenna selection pattern transmission technology:

$$K \times \log_2 M + \left\lfloor \log_2 \binom{N_T}{K} \right\rfloor = 2 \times \log_2 64 + \lfloor \log_2 276 \rfloor$$
$$= 12 + 8$$
$$= 20 \text{ bit}$$

The simulation result of the throughput versus Signal-to-Noise Ratio (SNR) is as follows.

It is possible to compare the data transmission method of the present disclosure and the convention technology in throughput based on the simulation result. Compared to the method of using all antennas, the method of the present disclosure is capable of reducing the hardware complexity and transmit power to ⅕ with the decrease of throughput to only ⅓, resulting in improvement of performance. By taking the feedback signal processing complexity into consideration, the proposed method has extra gain. As compared to the antenna selection technology, the proposed method shows extra performance gain. The gain obtained in the method of the present disclosure is obtained with the extra DOF through the antenna selection pattern.

The DOF means independent signal transmission paths that can be acquired when the SNR is large enough. As a consequence, DOF corresponds to the slop of the SNR versus capacity graph and can be defined as following equation.

$$DoF = \lim_{\rho \to \infty} \frac{C(\rho)}{\log(\rho)}$$

| | Use of all Tx antennas | Tx technology using antenna selection pattern | Antenna selection method (Same hardware as proposed method) |
|---|---|---|---|
| Hardware complexity | $N = \min(N_T, N_R)$ | K | K |
| Tx power | $N \times P_{max}$ | $K \times P_{max}$ | $K \times P_{max}$ |
| | N | K + 1 | K |
| Maximum number of symbols transmittable | N | K + 1 | K |
| Maximum number of bits transmittable | $N \log_2 M$ | $K \log_2 M + \left\lfloor \log_2 \binom{N_T}{K} \right\rfloor$ | $N \log_2 M$ |

In an embodiment of the present disclosure, each of the transmitter and the receiver includes an antenna array capable of transmitting and receiving data. Each of the transmitter and the receiver may include a controller for operating data transmitted and received through the antenna array and controlling the antenna array according to the operation result.

The data transmission and reception method and apparatus of the present disclosure are advantageous in increasing the throughput of the MIMO communication system.

Also, the data transmission and reception method and apparatus of the present disclosure are capable of making it possible to design a transceiver superior to the conventional transceiver in complexity and performance.

Also, the data transmission and reception method and apparatus of the present disclosure is capable of acquiring extra Degree of Freedom (DOF) as compared to the conventional communication technologies and thus increasing the number of symbols that can be transmitted at a time.

Furthermore, the data transmission and reception method and apparatus of the present disclosure are applicable to conventional MIMO communication systems to obtain extra performance gain without being restricted to certain conditions.

It is to be appreciated that those skilled in the art can change or modify the embodiments without departing the technical concept of this disclosure. Accordingly, it should be understood that above-described embodiments are essentially for illustrative purpose only but not in any way for restriction thereto. Thus the scope of the disclosure should be determined by the appended claims and their legal equivalents rather than the specification, and various alterations and modifications within the definition and scope of the claims are included in the claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A data transmission method for a transmitter in a multiple-input multiple-output (MIMO) system, the method comprising:
   identifying data comprising a first and second part of the data;
   identifying a combination of antennas used for transmitting the data based on mapping information between a plurality of combinations of antennas and a plurality of bit sequences comprising the first part of the data, wherein a size of the first part of the data is determined by a number of combinations of antennas based on a total number of antennas and a number of antennas used for transmitting the data;

modulating the second part of the data; and transmitting the modulated second part of the data using the identified combination of antennas.

2. The method of claim 1, wherein a size of the first part of the data is identified based on a number of antennas of the transmitter.

3. The method of claim 1, further comprises transmitting another modulated data using at least one antenna except for the identified combination of antennas, and wherein the other modulated data comprises data for verifying validity of the modulated second part of the data.

4. The method of claim 1, further comprising:

monitoring channel state per antenna; and identifying a subset of the antennas to be used for transmission based on a result of the monitoring, wherein identifying the combination of antennas comprises:

identifying the combination of antennas based on the subset, wherein identifying the subset of the antennas comprises identifying the subset having a channel quality indicator (CQI) that is equal to or greater than a predetermined value based on a result of the monitoring.

5. The method of claim 1, wherein the combination of antennas is identified at a receiver based on channel information.

6. A transmitter for transmitting data in multiple-input and multiple-output (MIMO) system, the transmitter comprising:

an antenna array including a plurality of antennas; and a controller coupled with the antenna array, the controller configured to:

identify data comprising a first and second part of the data;

identify a combination of antennas used for transmitting the data based on mapping information between a plurality of combinations of antennas and a plurality of bit sequences comprising the first part of the data, wherein a size of the first part of the data is determined by a number of combinations of antennas based on a total number of antennas and a number of antennas used for transmitting the data;

modulate the second part of the data; and transmit the modulated second part of the data using the identified combination of antennas.

7. The transmitter of claim 6, wherein a size of the first part of the data is identified based on a number of antennas of the transmitter.

8. The transmitter of claim 6, wherein the controller is configured to transmit another modulated data using at least one antenna except for the identified combination of antennas, and wherein the other modulated data comprises data for verifying validity of the modulated second part of the data.

9. The transmitter of claim 6, wherein the controller is configured to:

monitor channel state per antenna;

determine a subset of the antennas to be used for transmission based on a result of monitoring; and identify the combination of antennas based on the subset, and wherein the controller is configured to identify the subset having a channel quality indicator (CQI) that is equal to or greater than a predetermined value based on the result of monitoring.

10. The transmitter of claim 6, wherein the combination of antennas is identified at a receiver based on channel information.

11. A data reception method for a receiver in a multiple-input multiple-output (MIMO) system, the method comprising:

receiving, from a transmitter, a signal comprising a second part of data modulated by the transmitter;

identifying a combination of antennas used for transmitting data, by the transmitter, based on the received signal;

recovering a first part of the data included in the signal according to pre-mapping information between a plurality of combinations of antennas and a plurality of bit sequences comprising the first part of the data, wherein a size of the first part of the data is determined by a number of combinations of antennas based on a total number of antennas and a number of antennas used for transmitting the data at the transmitter;

demodulating the second part of the date included in the received signal; and decoding the data using the recovered first part of data and the demodulated second part of data.

12. The method of claim 11, wherein identifying the combination of antennas comprises identifying the combination of antennas of the transmitter for transmitting the signal based on a strength of the received signal.

13. The method of claim 11, wherein identifying the combination of antennas comprises identifying the combination of antennas of the transmitter for transmitting the signal based on an assumption that a number of antennas used in transmission is less than a number of antennas not used in transmission.

14. The method of claim 11, wherein the combination of antennas of the transmitter used for transmitting the signal is identified based on channel information.

15. A receiver for receiving data in multiple-input and multiple-output (MIMO) system, the receiver comprising:

an antenna array including a plurality of antennas; and a controller coupled with the antenna array, the controller configured to:

Receive, from a transmitter, a signal comprising a second part of data modulated by the transmitter;

identify a combination of antennas used for transmitting the data by the transmitter based on the received signal;

recover a first part of the data included in the signal according to pre-mapping information between a plurality of combinations of antennas and a plurality of bit sequences comprising the first part of the data, wherein a size of the first part of the data is determined by a number of combinations of antennas based on a total number of antennas and a number of antennas used for transmitting the data at the transmitter;

demodulate the second part of the data included in the received signal; and decode the data using the recovered first part of data and the demodulated second part of data.

16. The receiver of claim 15, wherein the controller is configured to identify the combination of antennas of the transmitter for transmitting the signal based on a strength of the received signal.

17. The receiver of claim 15, wherein the controller is configured to identify the combination of antennas of the transmitter for transmitting the signal based on an assumption that a number of antennas used in transmission is less than a number of antennas not used in transmission.

18. The receiver of claim 15, wherein the combination of antennas of the transmitter used for transmitting the signal is identified based on channel information.

\* \* \* \* \*